United States Patent Office

3,092,499
Patented June 4, 1963

3,092,499
METHOD OF MANUFACTURING MEAT PRODUCTS
Albert C. Gretler, Downers Grove, and Joseph C. Wilcox, Park Forest, Ill., assignors, by mesne assignments, to Armour and Company, Chicago, Ill., a corporation of Delaware
No Drawing. Filed Oct. 6, 1960, Ser. No. 60,783
15 Claims. (Cl. 99—109)

This invention relates to the processing of comminuted meat products. More particularly this invention relates to a process for manufacturing meat products such as sausages and the like, wherein the meat is subjected to rapid internal heating as by passing an electric current therethrough.

This application is a continuation-in-part of our co-pending application Serial No. 846,795, filed October 16, 1959, now abandoned.

Meat packers have long awaited the development of effective methods for rapidly producing the well-known cooked meat products such as sausages, and particularly frankfurters.

In their search for rapid cooking methods prior workers in this field have turned to electrical heating. The passage of an electrical current through the meat heats the meat very quickly and enables the meat to be cooked in only a very small fraction of the time which is required by the usual methods. However, such methods have been found to leave much to be desired, and many problems have been encountered. Among the difficulties which have arisen in connection with the use of the rapid internal heating are: unsatisfactory or excessive surface rendering in the cooked product, and generally unsatisfactory texture. By "texture" we mean the particular disposition and structural quality of the particles of the meat, the relationship of the particles with each other, the attitude of the particles toward contained moisture, and the blend of tenderness and firmness, all of which imparts either a favorable or unfavorable impression to a person when he bites into and chews a piece of meat.

The art has not known why these difficulties are had with the electrical cooking step or why this method of cooking and protein coagulation should be different in these respects from the usual cooking by heat penetration from the meat surface. The problem has been complicated by the very complex mechanism of protein coagulation in mixtures of fat and protein and physical or chemical relationships could be involved.

It is therefore an object of this invention to provide a method of manufacturing sausages and the like which utilizes the rapid internal heating such as is accomplished by the passage of an electric current through the meat body but which eliminates the difficulties above mentioned. We have for a further object the provision of a method by which sausages are rapidly prepared and the sausages so prepared have a texture comparable to high quality sausages produced by the slower methods.

We have discovered that substantially improved sausage products may be prepared if the meat is subjected to a conditioning procedure prior to the step of rapid cooking to coagulate the proteins by generation of heat within the meat body. This conditioning procedure involves several steps which have an effect on the physical and chemical properties of the meat. We cannot fully explain why these changes are produced by this conditioning procedure and thus affects the appearance and texture of the product resulting from the rapid heating produced by an electrical current, but we have observed that it has such an effect on the final cooked product.

In practice, the invention generally includes the preparation of the comminuted meat, the chilling of the comminuted meat and conditioning with agitation the meat in an atmosphere of reduced air. The meat so treated may then be warmed somewhat, put into a desired shape, usually in the form of a cylinder, and an electric current passed through the body of the meat to coagulate proteins in the meat and set the texture. Following is a more detailed explanation of the invention.

In preparing sausages the meat cuts, which may be either beef, pork, or veal, or any combination thereof, are generally first ground through a standard meat grinder or otherwise comminuted in any suitable way. Following the initial grinding operation, the sausage mixture may be placed either in a standard meat chopper or a mixer. Ice may be added during this operation to hold down the temperature which would normally rise due to the rapid action of the apparatus. The ice is converted to water which is absorbed by the mixture and held in suspension throughout the manufacturing process.

If the meat employed in preparing the sausage mixture is not pre-salted and pre-cured, salts and cure may be added at this point together with the spices. The kinds, quantities and proportions of spices used depend upon the amount of flavoring in the final product.

A further improvement in the comminuting operation may be accomplished by introducing the sausage mixture into an apparatus commonly known as a Mince Master for further reduction in size and blending. The essential components of this piece of equipment is a fine plate having knives that may be selectively adjusted as to tension. The sausage mixture is preferably introduced into the Mince Master at a temperature within the range of from about 34° F. to about 60° F. and remains in the apparatus for a period long enough to allow the mixture to move through it. During the mincing operation the temperature of the comminuted sausage mixture may rise somewhat and when withdrawn is usually within a temperature range of from about 50° F. to about 75° F.

Following the removal from the Mince Master the sausage mixture may be held at the temperature it attains therein for a period of from one to six hours, and preferably two or three hours, to allow the mixture to develop bind properties characteristic of good texture in the final product and to hasten formation of the desired cured color. This pre-curing step may also take place at some later step in the processing of the mixture, as will be indicated hereinafter.

It is important to the production by internal heating of a commercially acceptable product that the sausage mixture be subjected to a chilling operation. The preferred temperature range at which the chilling is accomplished is from about 18° F. to about 50° F., with the optimum range being from about 36° F. to about 40° F. The chilling operation generally takes place in a freezer compartment capable of maintaining the desired temperature conditions and large enough to accommodate the quantity of sausage mixture undergoing processing. The time necessary to bring substantially all of the sausage mixture to the desired temperature is, of course, dependent on the volume of mixture, the area in which it is confined, and the efficiency of the cooling equipment. Rapid chilling may be achieved by contacting the mixture directly with Dry Ice or liquid carbon dioxide. The latter agents bring about the desired temperature in a matter of minutes.

While an excellent product is obtained by chilling to about 18° F. to 38° F., and preferably in the specific range of 22° F. to about 25° F., a substantial time period is required to bring the mass up to the temperature of about 30° F. to about 60° F., at which it is introduced into the mold and, instead of employing the lower range, one may chill to 50° F. or below, and preferably within the range of 36° F. to 40° F. There is the advantage that after this holding period in the range of 36° F. to 40° F., the conditioned mass may be introduced, without a tempering period, into the mold.

To chill the mass, water ice, and, if desired, chilled water, may be added until the mass contains the desired amount of water, and for further chilling, Dry Ice or liquid carbon dioxide may be brought directly into contact with the mixture. Instead of the Dry Ice or liquid carbon dioxide, a heat exchange device, such as a votator, may be employed to chill the mixture to the desired range.

Before chilling the sausage mixture to bring it within the range of 18° F. to about 50° F., we prefer to vacuumize the mixture. In a continuous operation, a vacuum pump may be employed. Alternatively, the sausage mixture, after the chilling operation, may, if desired, be subjected to mechanical mixings, and a vacuum mixer may be employed. Vacuum mixing serves to effectively exhaust air entrapped in the sausage mixture and appears responsible in part for producing a product of an improved texture, enhanced color stability and better internal appearance. An effective alternative to employing a vacuum mixer in particular at this stage in the processing of the mixture, is to utilize a vacuum chopper in the earlier stages of conditioning the meat that is, prior to the chilling operation. In the event such apparatus is employed in the earlier stages further reworking of the sausage mixture after chilling may be omitted.

The sausage mixture generally undergoes vacuum mixing for from two to five minutes, with the preferred time being three minutes. The vacuum maintained on the mixture may range from about 15 to 29 inches of mercury, with optimum results being realized at 25 inches of mercury.

If the sausage mixture is chilled within a range below 30° F., the sausage mixture following removal from the mixer is tempered by warming and holding at a temperature of from about 30° F. to about 60° F. and preferably from about 35° F. to 45° F. until substantially all of the mixture attains the desired temperature. The length of time required to achieve this end is, of course, again directly dependent on the volume of mixture being processed, the area available, and the efficiency of the equipment utilized. Another factor influencing the length of the tempering period relates to whether the sausage mixture has been pre-cured as earlier described. If pre-curing has not occurred prior to tempering, a longer tempering period may be required to further develop the bind properties essential to good texture and to form the desired cure color.

The tempering operation materially contributes to the texture, appearance and overall consumer acceptability of the final product. In addition, the rise in temperature of the sausage mixture brought about by tempering renders the mixture more compatible with the mold temperatures and thus has the effect of finally preparing the mixture for extrusion into a mold.

Following tempering, the sausage mixture is extruded into a mold which preferably does not have a temperature radically different from that of the tempered sausage mixture. The temperature of the mold may be altered by spraying water into the mold cavity prior to extruding the sausage mixture therein. A water jacket or other suitable temperature regulating means may also be employed for this purpose. Compatibility between the temperature of the sausage mixture and mold tends to maintain the conditioned sausage mixture in a state ready for cooking and aids in retention of texture and color characteristics developed during processing.

Where the conditioning or holding period in which cure color and binding characteristics develop is carried on within the higher temperature range above 30° F., and preferably in the range of 36° F. to 40° F., the tempering operation may be omitted, and the sausage mixture may be introduced directly into the mold.

In order to determine that the sausage mixture has developed the desired texture characteristics for introduction into the mold, we may employ certain simple practical tests. For example, when the sausage mixture, which has a gray color, changes during the above holding period to a pink color, we generally find that the material has developed satisfactory binding characteristics. This change occurs under 24 hours and within 12 hours or less. In practical operations, the operator is able to determine by sense of feel that the material is ready for the molding operation, as when a sample held between the fingers loses its greasy characteristic and there is no feel of free water, the mixture having a tacky or sticky feel.

A unit mass of the mixture is extruded into a cylindrical or other suitably shaped mold at a sufficient pressure to produce a product free of voids. The extrusion process is continued until the limits of the mold cavity correspond with the desired size, shape and weight of the sausage being manufactured. The comminuted sausage mixture is generally introduced into the mold at a temperature of from about 30° F. to about 60° F.

In the preferred practice of this invention, the mold is employed in connection with apparatus which is capable of rapid internal cooking of the sausage mixture. This may be accomplished by holding the comminuted sausage mixture in the mold and bringing electrodes into contact with each end of the mixture, thus making the mixture part of an electric circuit. An alternating electric current may then be passed through the mixture which represents a moderate electrical resistance in the circuit. The flow of current through this resistance results in the generation of internal heat sufficient to cook the unit mass of mixture. It is preferred that the electrical cooking means employed be associated with an integrator, the function of which is to assure that a fixed amount of electrical energy will be passed through each unit mass of mixture regardless of any variation in the electrical resistivity of the mixture. In this manner, the proteins will be coagulated and the cure color set, resulting in a final product having the desired texture and appearance.

The cooking time generally is about one-third of a second, but this interval may vary depending on the temperature of the mixture at the time of current flow, the size of the unit mass of mixture, the salt content thereof, and the amount of electrical energy passed through the unit mass. In some operations, it is found that the cooking time may extend as long as one second. Following cooking, which takes place at a temperature of from about 150° F. to about 212° F., and preferably at from about 155° F. to about 180° F., the cooked unit mass of sausage mixture is ejected from the mold by suitable mechanical means.

After ejection from the mold, the cooked sausage is ready for further processing such as smoking, dyeing, chilling and packaging. In accordance with the teachings of this invention, the term "sausage" is intended to mean all products comprising ground meat, such as beef, ham, veal, pork products and, in particular, such items as frankfurters, bologna, luncheon loaf, and other well-known cooked sausage products.

As indicated earlier, we are not table to explain the theory by which the various factors described above yield the improved and otherwise unattainable results manifested, and we must therefore content ourselves with the observation of their effect on the final product. By thus conditioning and treating the sausage mixture, the final product has a highly desirable internal and external appearance, excellent texture, and an optimum moisture content.

For the purpose of illustration, the following specific examples for manufacturing frankfurters are given:

*Example 1*

Fresh beef comprising boneless beef chucks, trimmings and plates were placed in a grinding machine and ground through a plate having 3/16 inch holes. The ground beef mixture was introduced into a chopping machine and sufficient cracked ice was added thereto and chopped in thoroughly. Spices and salts in customary proportions were then blended into the mixture. Fresh pork cuts which had been cut into approximately 4 inch pieces were then added to the mixture and chopped to speck fat size and thoroughly mixed into the beef mixture for about 3 minutes at a temperature of 36° F. The comminuted meat mixture was then placed in a Griffith's Mince Master and blended. The blended mixture was removed from the Mince Master at a temperature of 22° F. The meat mixture was maintained in the freezer compartment for approximately 18 hours until substantially all of the meat had achieved a temperature of below 25° F. The meat mixture was then broken up and mixed in a suitable working machine of the vacuum type for about 3 minutes under a vacuum of 25 inches of mercury for removal of residual air in the mixture. Following vacuum mixing, the meat mixture was tempered for about 16 hours to bring it to a temperature of 38° F. Unit masses of the tempered meat mixture were then extruded and compacted into a cylindrical mold of a forming machine and subjected to internal heating alternating current along the longitudinal axis of the unit masses for approximately 1/3 of a second by means of electrodes in contact with each end of the sausage mixture while in the molds. The temperature achieved during this interval was 165° F. and was sufficient to further develop and set the cure color and texture of the mixture. The cooked sausage was then ejected from the mold and subjected to post-forming steps leading to a commercially acceptable final product.

*Example II*

In this example, ground beef ingredients were placed in the chopper and 11 pounds (1/2 of added moisture) of water ice were placed over the beef. The material was chopped long enough to blend, requiring about 30 seconds. A-R cure, dissolved in a little warm water, spice and salt were then added and blended, requiring about 15 seconds. Ground pork was then added, and the remainder of the added moisture, as chilled water, was added slowly at about 40° F. The partial emulsion from the chopper was removed and put through a Mince Master fitted with a fine plate, the emulsion temperature at this point being about 62° F. to 63° F. The emulsion was then placed in a vacuum mixer and vacuum mixed. After removal from the mixer, the emulsion was spread on trays and transferred to a 36° F. cooler for cure and bind development. The gray color of the material changed to pink in about 16 hours, and it was found by feel that the material had developed the desired bind characteristics. The material was then removed from the trays and the emulsion packed in a feeding hopper. From the hopper, unit masses were then extruded and compacted into a cylindrical mold of a forming machine and subjected to internal heating of 160° F., the heating being applied by alternating current along the longitudinal axis of the unit masses for approximately 1/3 of a second by means of electrodes in contact with each end of the sausage mixture while in the molds. The cooking was sufficient to set the cure color and texture of the mixture, and the cooked sausage was then ejected from the mold and subjected to post-forming steps leading to a commercially acceptable final product.

*Example III*

The process was carried on as described in Example II except that a vacuum pump was used to vacumize the emulsion instead of the vacuum mixer, and instead of holding the emulsion in trays, the emulsion was held in bags during the holding period for the development of cure color and binding characteristics. Also, in this operation, liquid $CO_2$ was used to chill the emulsion to 36° F. While quick cooling was effected, it was still necessary to have the holding period for color cure and bind development.

*Example IV*

Comparable results were obtained in an operation carried on as described in Example III except that instead of employing liquid $CO_2$ or Dry Ice, a votator was used to chill the product to 36–38° F. While quick chilling was effected by this means, it was still necessary to have a holding period for the cure color and bind development.

The foregoing detailed description has been given for purposes of explanation only, and it is expected that many changes may be made in the details of the procedures without departing from the spirit of the invention.

We claim:
1. In a process for the manufacture of sausages wherein meat is comminuted and then extruded into a mold where it is subjected to the passage of an electric current to internally heat the same and to coagulate proteins therein, the steps of conditioning the comminuted meat for texture development by a procedure which includes holding it in an atmosphere having a temperature of from about 18° F. to about 50° F. until substantially all of the comminuted meat attains said temperature, vacuum mixing the thus chilled comminuted meat to form a mixture which is conditioned for extrusion, extruding the conditioned meat into a mold, and subjecting the meat while in the mold to an electric current to heat the same and to coagulate proteins therein whereby to set the texture of the extruded meat.

2. In a process for the manufacture of sausages wherein meat is comminuted and then extruded into a mold where it is subjected to the passage of an electric current to internally heat the same and to coagulate proteins therein, the steps of conditioning the comminuted meat for texture development by a procedure which includes holding it in an atmosphere having a temperature of from about 18° F. to about 50° F. until substantially all of the comminuted meat attains said temperature, vacuum mixing the thus chilled comminuted meat to form a mixture which is conditioned for extrusion, tempering the chilled and mixed comminuted meat to render the same compatible with the temperature of a mold, extruding the tempered meat mixture into the mold and subjecting the meat while in the mold to an electric current to heat the same and to coagulate proteins therein whereby to set the texture of the extruded meat.

3. In a process for the manufacture of sausages wherein meat is comminuted and then extruded into a mold where it is subjected to the passage of an electric current to internally heat the same and to coagulate proteins therein, the steps of conditioning the comminuted meat for texture development by a procedure which includes bringing the temperature of substantially all of the comminuted meat to a temperature of from about 18° F. to about 40° F., vacuum mixing the meat while at said temperature to form a mixture which is conditioned for extrusion, extruding the conditioned meat mixture into a mold, and subjecting the meat mixture while in the mold to an electric current to heat the same and to coagulate proteins therein whereby to set the texture of the meat.

4. In a process for the manufacture of sausages wherein meat is comminuted and then extruded into a mold where it is subjected to internal heating by electric current to coagulate proteins therein, the steps of vacuum mixing and conditioning the comminuted meat which is gray in color for texture development by a procedure which includes holding it in an atmosphere having a temperature between 18° F. and about 50° F. until the color of the meat changes from gray to pink, extruding the conditioned meat mixture into a mold, and internally heating the meat by electric current in the mold to coagulate the proteins therein to set the texture of the extruded meat.

5. In the process of the manufacture of sausages wherein meat is comminuted and then extruded into a mold where it is subjected to the passage of electric current to internally heat the same and to coagulate the proteins therein, the steps of conditioning the comminuted meat for texture development by a procedure which includes hold it in an atmosphere having a temperature of from about 36° F. to about 40° F. until substantially all of the comminuted meat attains said temperature, mechanically agitating the thus chilled comminuted meat in an atmosphere of reduced air to form a mixture which is conditioned for extrusion, holding the thus agitated meat for a period sufficient to achieve texture development, cured color and tempering, extruding the meat mixture into a mold, and subjecting the meat mixture while in the mold to an electric current to heat the same and to coagulate proteins therein whereby to set the texture and cured color of the extruded meat.

6. In a process for the manufacture of sausages wherein meat is comminuted and then extruded into a mold where it is subjected to the passage of an electric current to internally heat the same and to coagulate proteins therein, the steps of conditioning the comminuted meat for texture development by a procedure which includes holding it in an atmosphere having a temperature of from about 36° F. to about 40° F. until substantially all of the comminuted meat attains said temperature, mechanically mixing the thus chilled comminuted meat in an atmosphere of reduced air to form a mixture which is conditioned for extrusion, extruding the meat mixture into a pre-cooled mold, and subjecting the meat mixture while in the mold to an electric current to heat the same and to coagulate proteins therein whereby to set the texture of the extruded meat.

7. In a process for the manufacture of sausages wherein meat is comminuted and then extruded into a mold where it is subjected to the passage of an electric current to internally heat the same and to coagulate proteins therein, the steps of conditioning the comminuted meat for texture development by a procedure which includes chilling the comminuted meat mixture to a temperature of about 18° F. to about 50° F., vacuum mixing the chilled mixture to form a mixture which is conditioned for extrusion, holding the chilled and mixed meat mixture to temper it and to develop bind characteristics and cured color, extruding the thus conditioned meat mixture into a mold, and subjecting the meat mixture while in the mold to an electric current to heat the same and to coagulate proteins therein whereby to set the texture and cured color of the extruded meat.

8. In a process for the manufacture of sausages wherein meat is comminuted and then extruded into a mold where it is subjected to the passage of an electric current to internally heat the same and to coagulate proteins therein, the steps of conditioning the comminuted meat for texture development by a procedure which includes chilling the comminuted meat mixture to a temperature of from about 18° F. to about 50° F., mixing the chilled mixture in an atmosphere of reduced oxygen to remove residual air from said mixture, holding the mixture to temper it and to develop bind characteristics and cured color, extruding the thus conditioned meat mixture into a mold, and subjecting the meat mixture while in the mold to an electric current to heat the same and to coagulate proteins therein whereby to set the texture and cured color of the extruded meat.

9. In a process for the manufacture of sausage products wherein meat is subjected to the passage of an electric current to internally heat the same and to coagulate proteins therein, the step of conditioning said meat prior to said heating step by mechanically mixing the meat in comminuted form in an atmosphere of reduced oxygen after chilling the meat to a temperature of from about 18° F. to about 50° F.

10. A process for the manufacture of sausages comprising comminuting meat, chilling the comminuted meat to a temperature between about 18° F. and about 50° F., vacuum mixing the meat while in chilled condition, tempering the meat to raise the temperature of the meat to between about 30° F. to about 60° F., molding the thus tempered meat into cylindrical form, passing an electric current longitudinally through said meat while in cylindrical form to internally heat the meat and coagulate proteins therein, thus to set the texture of the meat.

11. A process for the manufacture of sausage products comprising passing an electric current through meat to internally heat the same and to coagulate proteins therein, and prior to said heating step subjecting the meat to a conditioning procedure which includes comminuting the meat, molding the comminuted meat at a temperature of between about 30° F. and about 60° F., and between said comminuting step and said molding step vacuum mixing the comminuted meat after chilling to a temperature of from about 18° F. to about 50° F.

12. In a process for the manufacture of sausage products wherein meat is subjected to the passage of an electric current to internally heat the same and to coagulate proteins therein, the steps of conditioning said meat prior to said heating step by mixing said meat while in comminuted form in an atmosphere of reduced air to remove residual air from the comminuted meat, and chilling the comminuted meat to a temperature between about 18° F. and about 50° F.

13. In a process for the manufacture of sausage products wherein meat is subjected to the passage of an electric current to internally heat the same and to coagulate proteins therein, the steps of conditioning said meat prior to said heating step by mixing said meat while in comminuted form in an atmosphere of reduced air to remove residual air from the comminuted meat, chilling the comminuted meat to a temperature between about 18° F. to about 50° F., molding the chilled meat and then subjecting said meat to said electric current for internal heating.

14. In a process for the manufacture of sausages wherein meat is comminuted and then extruded into a mold where it is subjected to the passage of an electric current to internally heat the same and to coagulate proteins therein, the steps of vacuum mixing and conditioning the comminuted meat, which is gray in color, for texture development by procedure which includes holding it in an atmosphere having a temperature of from about 18° F. to about 50° F. until the meat becomes pink in color, extruding the conditioned meat into a mold, and subjecting the meat while in the mold to an electric current to heat the same and coagulate proteins therein whereby to set the texture and color of the extruded meat.

15. The process of claim 14 in which the holding step is at a temperature of from 36° F. to about 40° F.

References Cited in the file of this patent

UNITED STATES PATENTS

| | | |
|---|---|---|
| 2,685,518 | Prohaska | Aug. 3, 1954 |
| 2,847,312 | Harper et al. | Aug. 12, 1958 |
| 2,877,118 | Hensgen et al. | Mar. 10, 1959 |